United States Patent
Tajiri

(10) Patent No.: US 8,934,051 B2
(45) Date of Patent: Jan. 13, 2015

(54) IMAGE PICKUP APPARATUS FOR ACQUIRING A PLURALITY OF VIEWPOINT IMAGES

(75) Inventor: Shinichiro Tajiri, Tokyo (JP)

(73) Assignee: Sony Corporation, Tokyo (JP)

( * ) Notice: Subject to any disclaimer, the term of this patent is extended or adjusted under 35 U.S.C. 154(b) by 632 days.

(21) Appl. No.: 13/169,269

(22) Filed: Jun. 27, 2011

(65) Prior Publication Data

US 2012/0002099 A1    Jan. 5, 2012

(30) Foreign Application Priority Data

Jul. 1, 2010    (JP) ................................ P2010-151401

(51) Int. Cl.
*H04N 5/235*    (2006.01)
*H04N 13/02*    (2006.01)
*H04N 5/353*    (2011.01)

(52) U.S. Cl.
CPC ........... *H04N 13/021* (2013.01); *H04N 5/3532* (2013.01); *H04N 13/0296* (2013.01)
USPC ...................................................... 348/362

(58) Field of Classification Search
USPC ........ 348/221.1, 224.1, 229.1, 308, 362, 367, 348/363; 396/245–256, 357, 449, 504; 257/291–292, 440, 443–448
See application file for complete search history.

(56) References Cited

U.S. PATENT DOCUMENTS 5,914,810 A    6/1999    Watts

2002/0008907 A1    1/2002    Yamamoto
2006/0050172 A1*   3/2006    You et al. ....................... 348/362
2010/0013982 A1*   1/2010    Amano .......................... 348/362

FOREIGN PATENT DOCUMENTS

| EP | 1 189 460 | 3/2002 |
| JP | 1060618 | 8/1974 |
| JP | 9-505906 | 6/1997 |
| JP | 10-271534 | 10/1998 |
| JP | 2000-137203 | 5/2000 |
| JP | 2002-027499 | 1/2002 |
| JP | 2002-34056 | 1/2002 |
| JP | 2004-228810 | 8/2004 |

OTHER PUBLICATIONS

European Patent Office, Extended European Search Report issued in connection with European Patent Application No. 11169690.2, dated Jul. 16, 2012. (4 pages).

Japanese Patent Office, Office Action issued in connection with Japanese Patent Application No. 2010-151401, dated Dec. 17, 2013. (3 pages).

* cited by examiner

*Primary Examiner* — Mekonnen Dagnew
(74) *Attorney, Agent, or Firm* — K&L Gates LLP

(57) ABSTRACT

Disclosed herein is an image pickup apparatus, including: an image pickup lens; a shutter capable of changing over a plurality of light paths from the image pickup lens individually between a light transmission state and a light blocking state; an image pickup element including a plurality of light receiving pixels for which exposure and signal reading out are carried out line-sequentially and adapted to acquire picked up image data based on transmission light beams of the light paths; and a control section adapted to control changeover between the light transmission state and the light blocking state of the light paths by the shutter.

8 Claims, 13 Drawing Sheets

F I G . 1
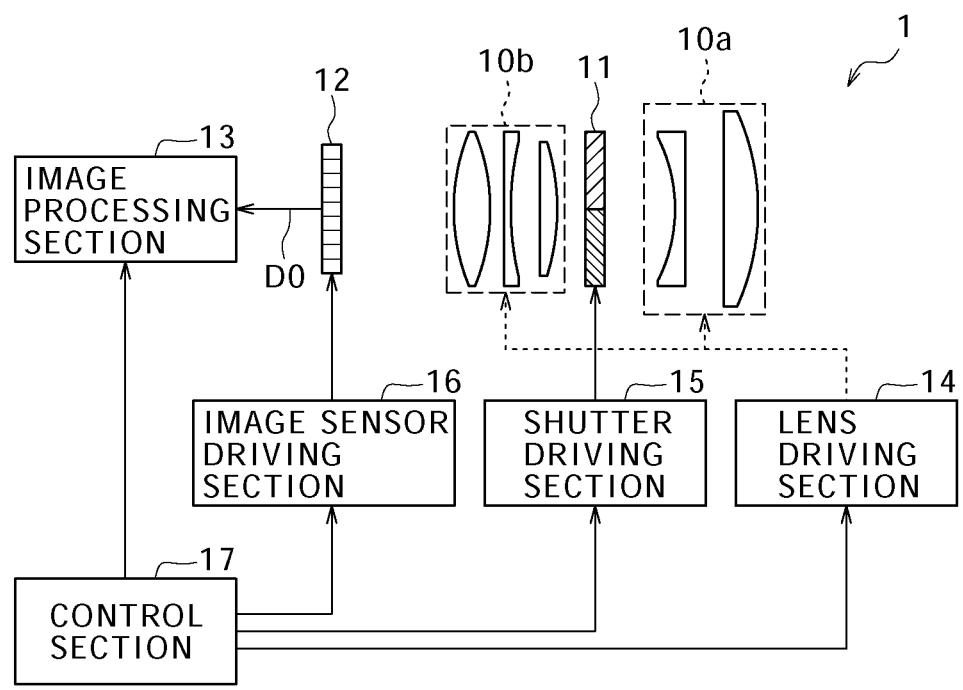
F I G . 2 A
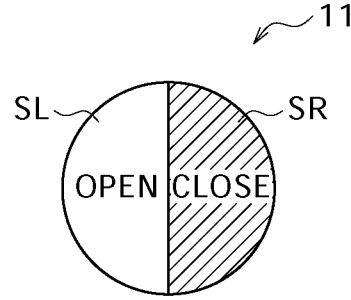
F I G . 2 B
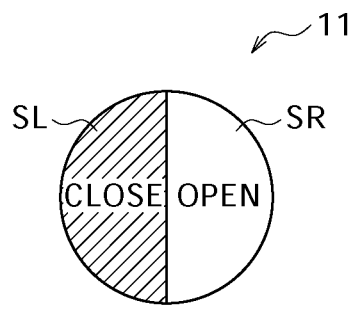

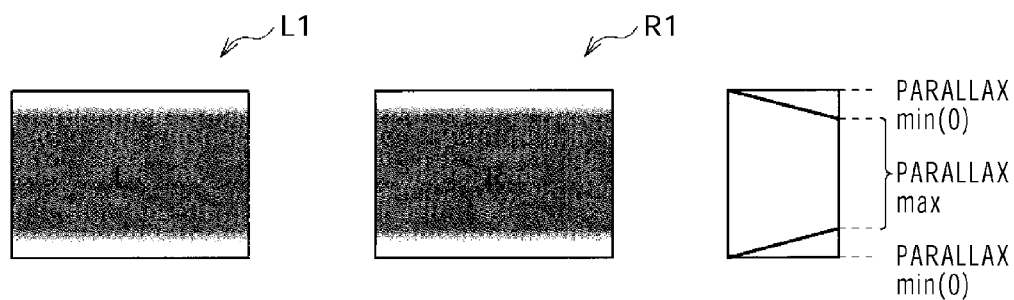
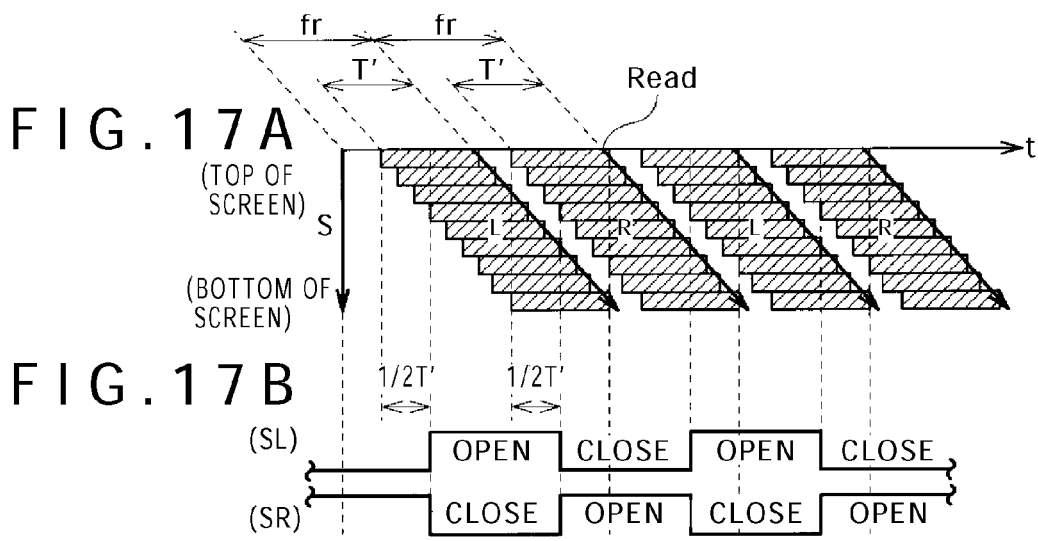
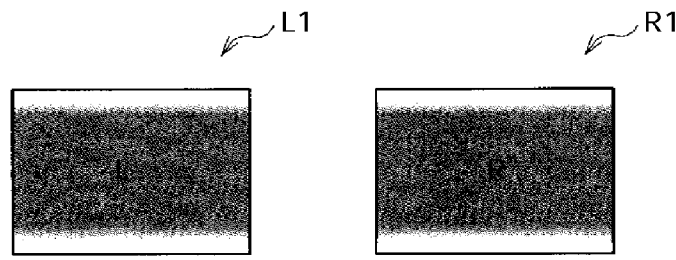

IMAGE PICKUP APPARATUS FOR ACQUIRING A PLURALITY OF VIEWPOINT IMAGES

CROSS REFERENCES TO RELATED APPLICATIONS

The present application claims priority to Japanese Priority Patent Application JP 2010-151401 filed in the Japan Patent Office on Jul. 1, 2010, the entire content of which is hereby incorporated by reference.

BACKGROUND

This application relates to an image pickup apparatus for picking up left and right viewpoint images, for example, for a stereoscopic vision.

Various image pickup apparatus have been proposed and developed heretofore. For example, a camera which is an image pickup apparatus and includes an image pickup lens and a shutter capable of changing over between transmission and blocking, that is, between opening and closing, for each of left and right regions has been proposed. A camera of the type just described is disclosed, for example, in Japanese Patent No. 1060618, Japanese Patent Laid-Open No. 2002-34056 or JP-T-H 9-505906. In the camera described, opening and closing of the shutter for the regions are time-divisionally changed over alternately so that two different images, that is, a left viewpoint image and a right viewpoint image, which look as if they were imaged in left and right viewpoint directions, can be acquired. By presenting the left viewpoint image and the right viewpoint image to the eyes of a human being using a predetermined technique, the human being can feel a stereoscopic effect from the images.

Most of such image pickup apparatus are directed to a still picture. However, also image pickup apparatus directed to a moving picture have been proposed and are disclosed, for example, in Japanese Patent Laid-Open No. Hei 10-271534 or Japanese Patent Laid-Open No. 2000-137203. In those image pickup apparatus, a CCD (Charge Coupled Device) image sensor of the global shutter type wherein light reception driving is carried out plane-sequentially is used preconditionally as an image sensor.

SUMMARY

However, in recent years, a CMOS (Complementary Metal Oxide Semiconductor) image sensor which can be produced at a lower cost than a CCD image sensor and can achieve reduced power consumption and enhanced speed processing has become the mainstream. Different from the CCD image sensor, the CMOS image sensor is an image sensor of the rolling shutter type wherein light reception driving is carried out line-sequentially. While, in the CCD image sensor, an overall screen image is picked up collectively at the same time in each frame, in the CMOS image sensor, exposure or signal reading out is carried out line-sequentially, for example, from an upper portion to a lower portion of the image sensor. Therefore, a time lag occurs in an exposure period or a reading out timing between different lines.

Therefore, if the CMOS image sensor is used in such an image pickup apparatus which picks up an image through changeover of a light path by means of a shutter as described above, then a time lag occurs between an exposure period for all lines in one frame and an open period of each region of the shutter. This gives rise to a problem that a plurality of images from different viewpoints cannot be acquired with a high degree of accuracy. For example, in order to acquire two left and right viewpoint images for an application to a stereoscopic vision, left and right transmission light beams exist in a mixed state in the proximity of the center of each of the viewpoint images. Therefore, the left and right parallax is lost, for example, in the proximity of the center of a screen image which is liable to be gazed by an observer. In other words, a stereoscopic effect is lost.

Therefore, it is desirable to provide an image pickup apparatus which can acquire a plurality of viewpoint images with a high degree of accuracy using an image pickup element of the line-sequentially driven type.

According to the technology disclosed herein, there is provided an image pickup apparatus including an image pickup lens, a shutter capable of changing over a plurality of light paths from the image pickup lens individually between a light transmission state and a light blocking state, an image pickup element including a plurality of light receiving pixels for which exposure and signal reading out are carried out line-sequentially and adapted to acquire picked up image data based on transmission light beams of the light paths, and a control section adapted to control changeover between the light transmission state and the light blocking state of the light paths by the shutter, the control section controlling the shutter such that, in each picked up image frame, the changeover between the light transmission state and the light blocking state of the light paths is carried out after delay by a predetermined period after starting of exposure for the first line of the image pickup element.

In the image pickup apparatus, the light paths are individually changed over between the light transmission state and the light blocking state by the shutter so that light reception based on a transmission light beam of each of the light paths is carried out by the image pickup element. Consequently, the image pickup element acquires picked up image data corresponding to a plurality of viewpoint images. Here, since the image pickup element carries out exposure and signal reading out line-sequentially, a displacement in time occurs in an exposure period or a reading out timing between different lines. Usually, by such displacement in time, transmission light beams of the different light paths are received in a mixed state and the parallax amount between the viewpoint images are likely to be reduced at a mid portion of an image, that is, a screen image, which is liable to be watched closely by an observer. However, in the disclosed image pickup apparatus, the changeover between the light transmission state and the light blocking state of the light paths is carried out, in each picked up image frame, after delay by the predetermined period after starting of exposure for the first line of the image pickup element. Therefore, such mixed existence of the transmission light beams of the light paths particularly at a mid portion of the image is less likely to occur.

With the disclosed image pickup apparatus, the control section carries out, in each picked up image frame, the changeover between the light transmission state and the light blocking state of the light paths after delay by the predetermined period after starting of exposure for the first line of the image pickup element as described above. Therefore, the image pickup element is likely to receive, particularly at a mid portion of a screen image which is liable to be watched closely by an observer, a transmission light beam from a desired viewpoint direction more than a light beam from the other viewpoint direction. Consequently, an image pickup element of the line-sequentially driven type can be used to acquire a plurality of viewpoint images with a high degree of accuracy.

Additional features and advantages are described herein, and will be apparent from the following Detailed Description and the figures.

BRIEF DESCRIPTION OF THE FIGURES

FIG. 1 is a block diagram showing a general configuration of an image pickup apparatus according to an embodiment;

FIGS. 2A and 2B are schematic plan views of a shutter shown in FIG. 1;

FIGS. 16A and 16B are schematic views of a left viewpoint image and a right viewpoint image obtained by timing control illustrated in FIGS. 15A and 15B, and FIG. 16C is a diagrammatic view illustrating a distribution of the parallax amount between the left and right viewpoint images;

FIGS. 17A and 17B are schematic views illustrating a relationship between a driving timing of an image sensor and opening and closing timings of a shutter in a modification 2;

FIGS. 18A and 18B are schematic views of a left viewpoint image and a right viewpoint image obtained by timing control illustrated in FIGS. 17A and 17B, and FIG. 18C is a diagrammatic view illustrating a distribution of the parallax amount between the left and right viewpoint images;

FIG. 20C is a diagrammatic view illustrating a distribution of the parallax amount between the left and right viewpoint images;

DETAILED DESCRIPTION

Figure 3:
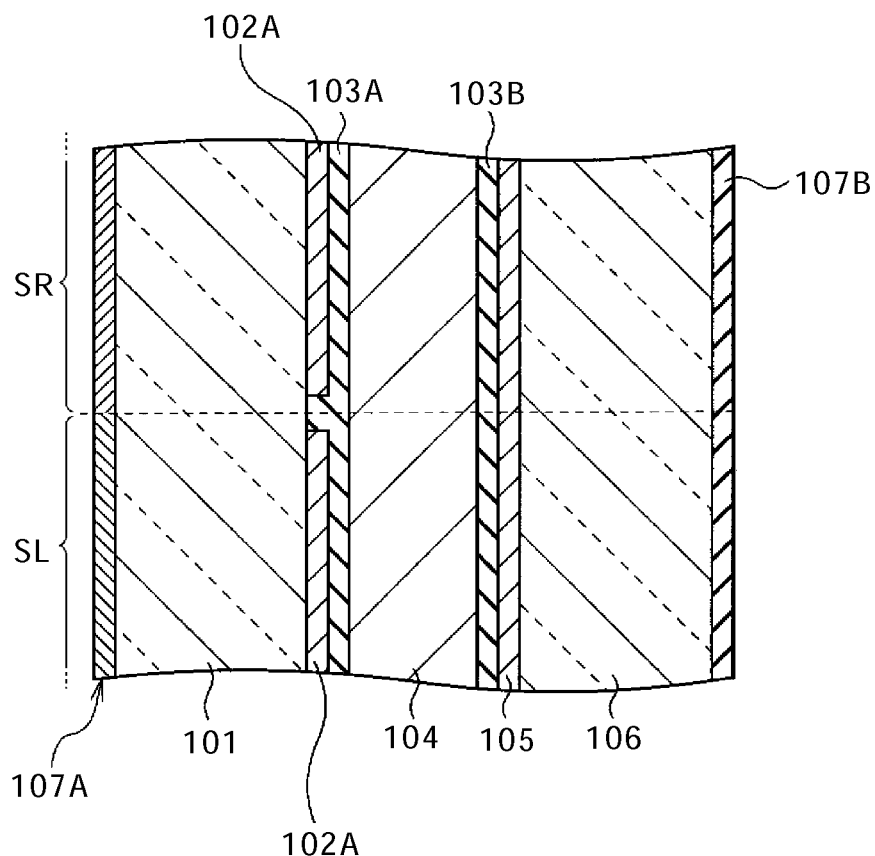
FIG. 3 is a schematic sectional view of the shutter shown in FIG. 1.

Embodiments of the present application will be described below in detail with reference to the drawings.

1. Embodiment (example wherein the changeover timing between opening and closing of a shutter is synchronized with an exposure starting timing at the center of a screen)

2. Modification 1 (example wherein the exposure period is reduced by changing the exposure starting timing)

3. Modification 2 (example wherein the exposure period is reduced by changing the signal reading out timing)

4. Modification 3 (example wherein changeover to a mode in which a valid frame is acquired for every other frame is carried out)

5. Modification 4 (example of an image pickup apparatus of the twin-lens type)

Embodiment

Configuration of the Image Pickup Apparatus 1

FIG. 1 shows a general configuration of an image pickup apparatus 1 according to an embodiment of the disclosed technology. Referring to FIG. 1, the image pickup apparatus 1 picks up an image of an image pickup object from a plurality of different viewpoint directions and acquires a plurality of viewpoint images, here, two left and right viewpoint images, alternately and time-divisionally as moving pictures or still pictures. The image pickup apparatus 1 is a single-lens camera and can carry out changeover between left and right light paths by shutter control. The image pickup apparatus 1 includes two image pickup lenses 10a and 10b, a shutter 11, an image sensor 12, an image processing section 13, a lens driving section 14, a shutter driving section 15, an image sensor driving section 16 and a control section 17.

The image pickup lenses 10a and 10b are lens groups for acquiring light beams from an image pickup object, and the shutter 11 is disposed between the image pickup lenses 10a and 10b. It is to be noted that, although the arrangement of the shutter 11 is not restricted particularly, ideally the shutter 11 is disposed at the position of a pupil plane of the image pickup lenses 10a and 10b or of an iris not shown. The image pickup lenses 10a and 10b function, for example, as zoom lenses and have a focal length which can be changed by adjustment of the distance between the image pickup lenses 10a and 10b or the like by the lens driving section 14. However, the image pickup lenses 10a and 10b are not limited to such variable-focus lenses but may be fixed-focus lenses.

Configuration of the Shutter 11

The shutter 11 has two left and right divisional regions and can carry out changeover between transmission or opening and blocking or closing for each of the divisional regions. The shutter 11 may be a mechanical shutter or an electric shutter such as, for example, a liquid crystal shutter if it can carry out such changeover as just described. A particular configuration of the shutter 11 is hereinafter described.

FIGS. 2A and 2B show an example of a configuration in plane of the shutter 11. Referring to FIGS. 2A and 2B, the shutter 11 has two left and right regions SL and SR disposed along a horizontal direction. The shutter 11 is controlled such that it is changed over alternately between a state wherein the region SL is open while the region SR is closed as seen in FIG. 2A and such a state wherein the region SR is open while the region SL is closed as seen in FIG. 2B. A particular configuration of the shutter 11 is described taking, for example, a liquid crystal shutter as an example. FIG. 3 shows a sectional configuration of the shutter 11 in the form of a liquid crystal shutter in the proximity of a boundary between the regions SL and SR.

Referring to FIG. 3, the shutter 11 includes a liquid crystal layer 104 enclosed between substrates 101 and 106 made of glass or the like, a polarizer 107A adhered to the light incoming side of the substrate 101, and an analyzer 107B adhered to the light outgoing side of the substrate 106. An electrode is formed between the substrate 101 and the liquid crystal layer 104 and is formed from a plurality of sub electrodes 102A, particularly from two sub electrodes 102A corresponding to the regions SL and SR. To the two sub electrodes 102A, a voltage can be supplied independently of each other. An electrode 105 common to the regions SL and SR is provided on the substrate 106 which opposes to the substrate 101. It is to be noted that, while the electrode on the substrate 106 is usually formed as a common electrode to the regions SL and SR, it is not limited to this, but may be formed from different electrodes individually corresponding to the regions. An orientation film 103A is disposed between the sub electrode 102A and the liquid crystal layer 104 while another orientation film 103B is formed between the electrode 105 and the liquid crystal layer 104.

Figure 4:
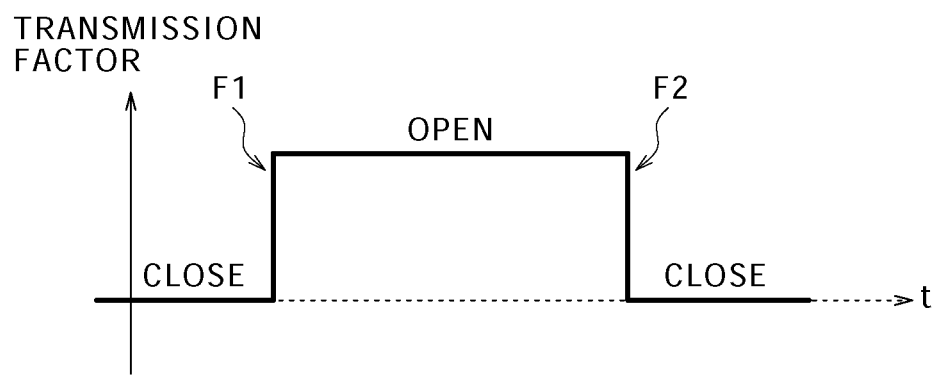
FIG. 4 is a schematic view illustrating an example of a response characteristic of the shutter shown in FIG. 1.

The sub electrode 102A and the electrode 105 are each formed from a transparent electrode, for example, of ITO (Indium Tin Oxide) or the like. The polarizer 107A and the analyzer 107B selectively transmit predetermined polarized light and are disposed so as to exhibit, for example, a crossed-Nicol or parallel-Nicol state. The liquid crystal layer 104 includes liquid crystal of any of various display modes such as, for example, an STN (Super-Twisted Nematic) mode, a TN (Twisted Nematic) mode and an OCB (Optical Compensated Bend) mode. It is to be noted that the liquid crystal preferably is of the type wherein the response characteristic thereof upon transition from the closed state to the open state of the shutter 11, that is, from low voltage application to high voltage application, and the response characteristic thereof upon transition from the open state to the closed state of the shutter 11, that is, from high voltage application to low voltage application, are substantially equal to each other, or in other words, the waveform of the response characteristic is substantially symmetric. Ideally, the liquid crystal exhibits a very high response speed upon transition to each state and exhibits such a characteristic that, for example as seen in FIG. 4, the transmission factor rises vertically upon transition from the closed state to the open state like an edge F1 and falls vertically upon transition from the open state to the closed state like another edge F2. As the liquid crystal which exhibits such a response characteristic as described above, for example, FLC (Ferroelectric Liquid Crystal) is available.

In the shutter 11 having such a configuration as described above, if a voltage is applied to the liquid crystal layer 104 through the sub electrode 102A and the electrode 105, then the transmission factor of the liquid crystal layer 104 can be varied in response to the magnitude and the application time of the applied voltage. In other words, by using a liquid crystal shutter as the shutter 11, changeover between the open state and the closed state of the shutter 11 can be carried out by voltage control. Further, since the electrode for the voltage application is formed from the two sub electrodes 102A which can be driven individually, changeover between the light transmission state and the light blocking state can be carried out alternately for each of the regions SL and SR.

The image sensor 12 is a photoelectric conversion element which outputs a light reception signal based on a beam of light transmitted through the image pickup lenses 10a and 10b and a predetermined region of the shutter 11. The image sensor 12 is an image pickup apparatus of the rolling shutter type, that is, of the line-sequentially driven type, such as a CMOS sensor which includes a plurality of photodiodes, that is, a plurality of light receiving pixels, disposed, for example, in a matrix and carries out exposure and signal reading out line-sequentially. It is to be noted that, for example, R, G and B color filters not shown having a predetermined color array may be disposed on the light receiving face side of the image sensor 12.

The image processing section 13 carries out a predetermined image process such as, for example, a noise reduction or mosaic process or a gamma correction process for picked up images, that is, for left and right viewpoint images based on picked up image data outputted from the image sensor 12. The image processing section 13 includes various memories for storing data before or after such image process. However, image data after the image process may otherwise be outputted to an external display apparatus without recording the same.

The lens driving section 14 is an actuator for shifting a predetermined lens in the image pickup lenses 10a and 10b along an optical axis to vary the focal distance.

The shutter driving section 15 carries out opening/closing changeover driving for each of the left and right regions SL and SR of the shutter 11 in accordance with timing control of the control section 17. In particular, when the region SL of the shutter 11 is in an open state, the shutter driving section 15 drives the shutter 11 so that the region SR is placed into a closed state, but on the contrary when the region SL is in a closed state, the shutter driving section 15 drives the shutter 11 so that the region SR is placed into an open state. Upon image pickup for moving pictures, the shutter driving section 15 drives the shutter 11 so that opening/closing changeover of the regions SL and SR is carried out time-divisionally and alternately. In the present embodiment, the open periods of the left and right regions of the shutter 11 correspond in a 1:1 corresponding relationship to frames, that is, a frame L and a frame R, corresponding to the regions, and the open periods of the regions and the one-frame period are substantially equal to each other.

The image sensor driving section 16 drives and controls the image sensor 12 in accordance with timing control of the control section 17. In particular, the image sensor driving section 16 drives the image sensor 12 of such a rolling shutter type as described above such that exposure and signal reading out of the image sensor 12 are carried out line-sequentially.

The control section 17 controls operation of the image processing section 13, lens driving section 14, shutter driving section 15 and image sensor driving section 16 at predetermined timings. For the control section 17, for example, a microcomputer or the like is used. Although details are hereinafter described, in the present embodiment, the control section 17 sets an opening/closing changeover timing of the shutter 11 so as to be displaced by a predetermined period from a frame start timing, that is, from an exposure starting timing for the first line.

Working Example of the Image Pickup Apparatus 1

1. Basic Operation

In such an image pickup apparatus 1 as described above, the lens driving section 14 drives the image pickup lenses 10*a* and 10*b* and the shutter driving section 15 drives the left region of the shutter 11 to an open state and drives the right region of the shutter 11 to a closed state under the control of the control section 17. Further, the image sensor driving section 16 drives the image sensor 12 in synchronism with the operations of the lens driving section 14 and the shutter driving section 15. Consequently, changeover to the left light path is carried out, and the image sensor 12 acquires left viewpoint image data D0L based on a light beam incoming from a left viewpoint direction.

Then, the shutter driving section 15 changes over the shutter 11 such that the right region of the shutter 11 is placed into an open state and the left region of the shutter 11 is placed into a closed state, and the image sensor driving section 16 drives the image sensor 12. Consequently, changeover to the right light path is carried out, and the image sensor 12 acquires right viewpoint image data D0R based on a light beam incoming from a right viewpoint direction.

Then, the image sensor 12 acquires a plurality of frames, that is, a plurality of picked up image frames, in a time series and the shutter 11 carries out changeover between open and closed states in a corresponding relationship to the picked up image frames, which are frames L and R hereinafter described. Consequently, a picked up image corresponding to a left viewpoint image and a picked up image corresponding to a right viewpoint image are acquired alternately along a time series, and a set of the images is inputted to the image processing section 13.

The image processing section 13 carries out a predetermined image process for picked up images, that is, a left viewpoint image L1 and a right viewpoint image R1 hereinafter described, based on the left viewpoint image data D0L and the right viewpoint image data D0R acquired in such a manner as described above to produce left and right viewpoint images, that is, a left viewpoint image L2 and a right viewpoint image R2 hereinafter described, for example, for a stereoscopic vision. The produces left viewpoint image L2 and right viewpoint image R2 are recorded into the image processing section 13 or outputted to the outside.

2. Principle of Viewpoint Image Capture

Figure 5:
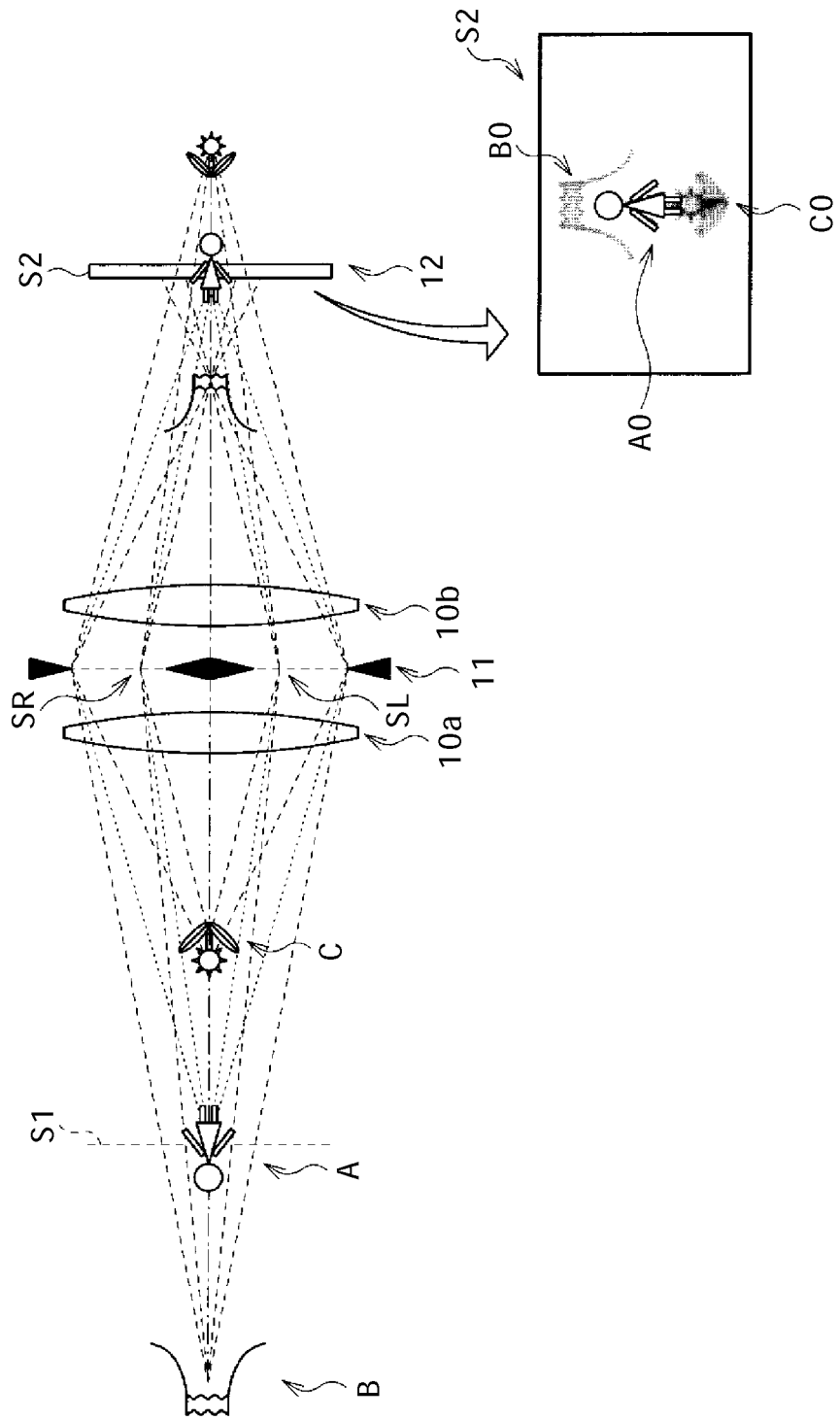
FIG. 5 is a schematic view illustrating a received light image in the case of 2D (two-dimensional) image pickup without changeover of optical paths.
Figure 6:
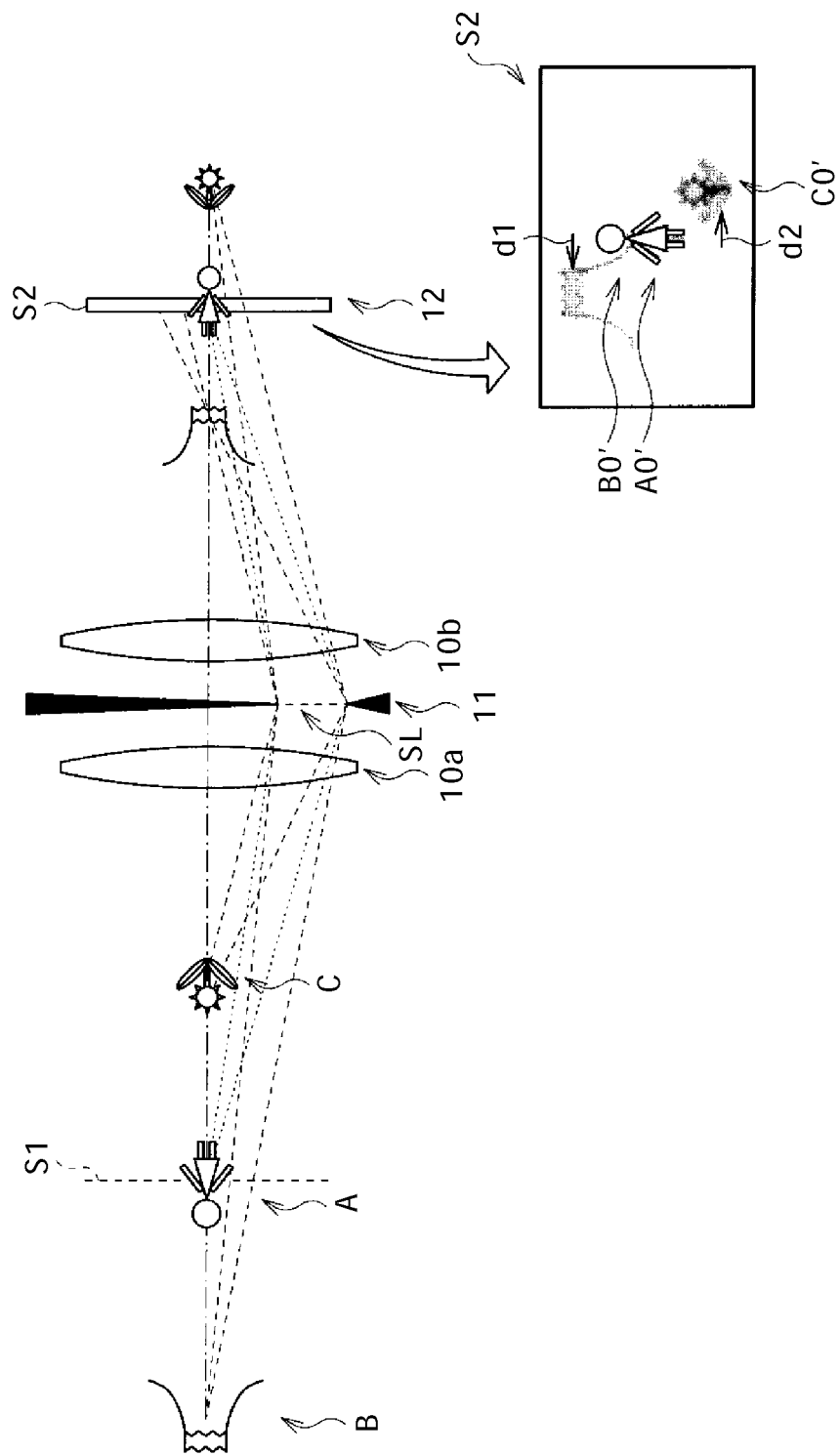
FIG. 6 is a schematic view illustrating a principle of acquisition of a left viewpoint image by the image pickup apparatus shown in FIG. 1.
Figure 7:
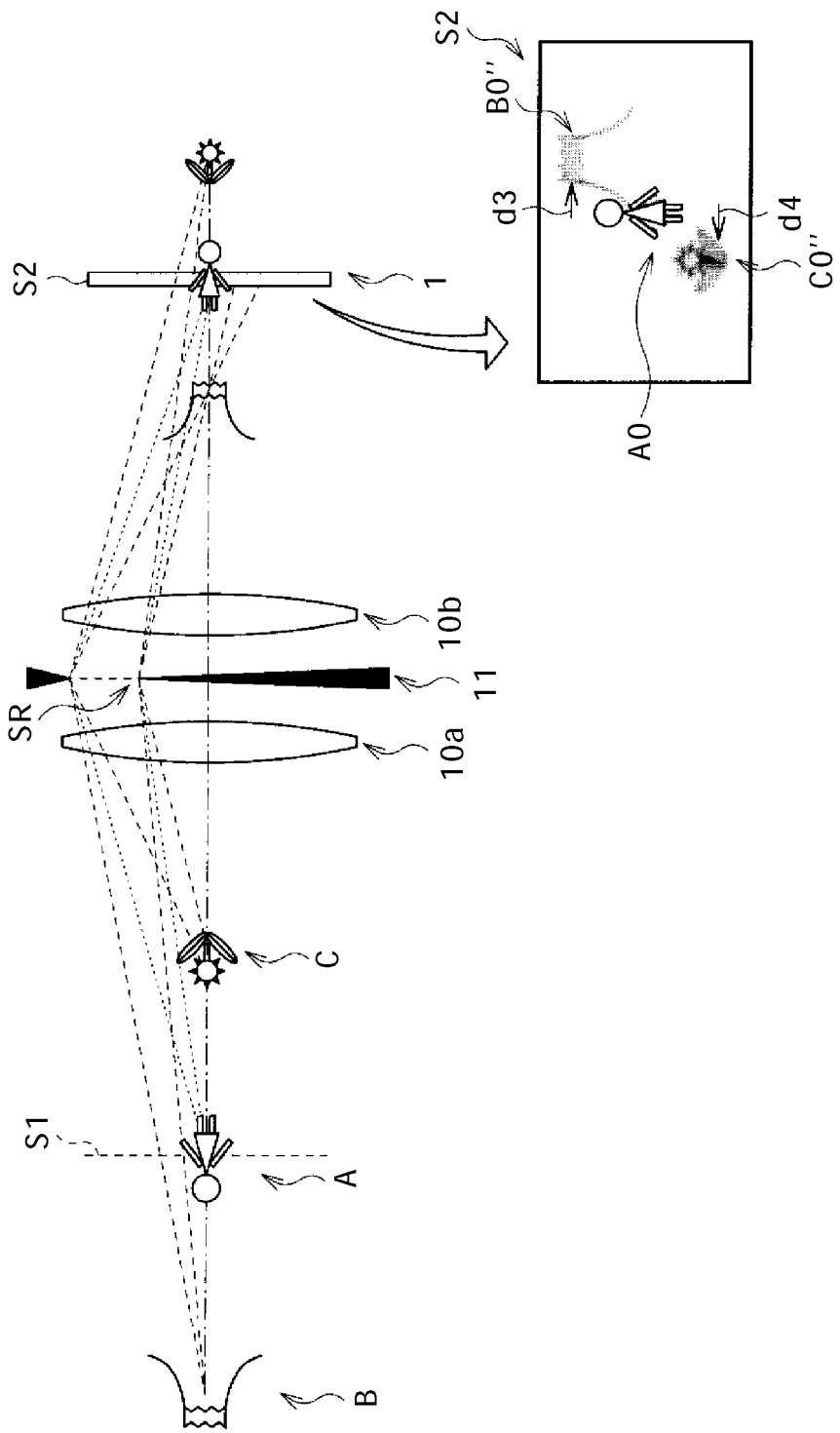
FIG. 7 is a similar view but illustrating a principle of acquisition of a right viewpoint image by the image pickup apparatus shown in FIG. 1.

Here, a principle of left and right viewpoint image acquisition in the case where a single-lens camera is used is described below with reference to FIGS. 5 to 7. FIGS. 5 to 7 are equivalent to views in the case where the image pickup apparatus 1 is viewed from above. However, for simplified illustration, the components of the image pickup apparatus 1 other than the image pickup lenses 10*a* and 10*b*, shutter 11 and image sensor 12 are omitted, and also the image pickup lenses 10*a* and 10*b* are shown in a simplified form.

First, a received light image in the case where left/right light path changeover is not carried out in ordinary 2D image pickup as seen in FIG. 5, that is, how to be imaged on the image sensor 12, is described hereinabove. Here, as an example of an image pickup object, three image pickup objects disposed at different positions from each other in the depthwise direction are taken. In particular, the three image pickup objects include an image pickup object A, which is a person, positioned on a focus plane S1 of the image pickup lenses 10*a* and 10*b*, another image pickup object B, which is a mountain, positioned on the interior side with respect to the image pickup object A, that is, on the remote side from the image pickup lens, and a image pickup object C, which is a flower, positioned on this side with respect to the image pickup object A, that is, on the image pickup lens side. In the case where the image pickup objects have such a positional relationship to each other as just described, an image of the image pickup object A is formed, for example, in the proximity of the center on a sensor plane S2. Meanwhile, an image of the image pickup object B positioned on the interior side with respect to the focus plane S1 is formed forwardly of the sensor plane S2, that is, on the image pickup lens side, and an image of the image pickup object C is formed on the interior side of the sensor plane S2, that is, on the remote side from the image pickup lens. In other words, on the sensor plane S2, the focused image A0 of the image pickup object A and the defocused images B0 and C0 are formed.

Left Viewpoint Image

If the light path is changed over between the left and the right with regard to the three image pickup objects A to C having such a positional relationship as described above, then the manner in which the image pickup objects A to C are imaged on the sensor plane S2 varies in the following manner. For example, if the shutter driving section 15 drives the shutter 11 such that the region SL on the left side of the shutter 11 is placed into an open state and the region SR on the right side of the shutter 11 is placed into a closed state, then light along the light path on the left side is transmitted while light along the light path on the right side is blocked as illustrated in FIG. 6. In this instance, in regard to the image pickup object A positioned on the focus plane S1, even if light along the light path on the right side is blocked, it is focused on the sensor plane S2 to form an image (A0) similarly as in the case where light path changeover is not carried out. However, as regards the image pickup objects B and C positioned in a displaced relationship from the focus plane S1, defocused images are imaged as such images B0' and C0' as are shifted in the opposite directions d1 and d2 to each other in the horizontal direction on the sensor plane S2.

Right Viewpoint Image

On the other hand, if the shutter driving section 15 drives the shutter 11 such that the region SR on the right side of the shutter 11 is placed into an open state and the region SL on the left side of the shutter 11 is placed into a closed state, then light along the light path on the right side is transmitted while light along the light path on the left side is blocked as illustrated in FIG. 7. Also in this instance, an image of the image pickup object A positioned on the focus plane S1 is formed on the sensor plane S2 while the image pickup objects B and C positioned in a displaced relationship from the focus plane S1 are imaged as such images B0" and C0" as are shifted in the opposite directions d3 and d4 to each other in the horizontal direction on the sensor plane S2. However, the shifting directions d3 and d4 are opposite to the shifting directions d1 and d2 in the left viewpoint image described above, respectively.

Parallax between the Left and Right Viewpoint Images

Figure 8A:
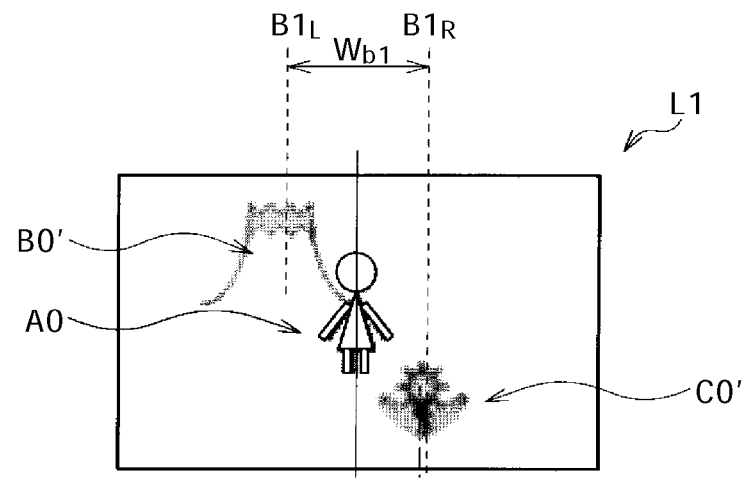
FIGS. 8A and 8B are schematic views illustrating a parallax between left and right viewpoint images acquired using the image pickup apparatus shown in FIG. 1.
Figure 8B:
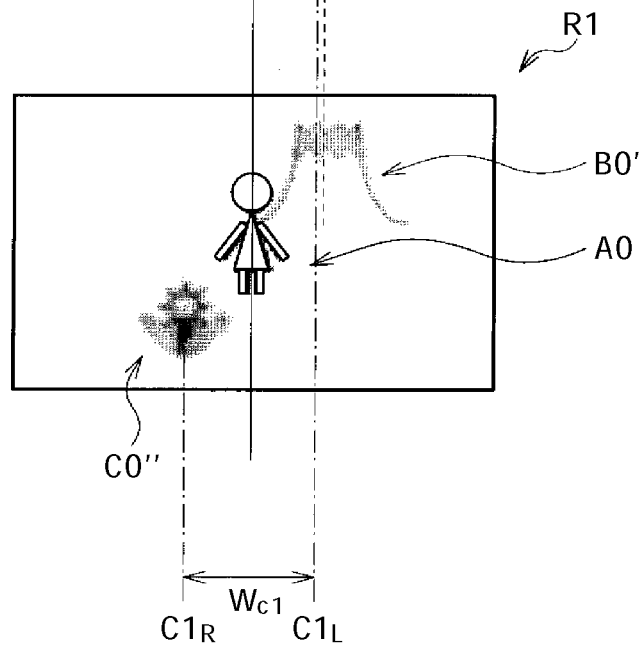

By changing over the opening and closing of the regions of the shutter 11 in such a manner as described above, the light paths corresponding to the left and right viewpoint directions are changed over and the left viewpoint image L1 and the right viewpoint image R1 can be acquired. Further, since the defocused images are shifted in the opposite directions to each other in the horizontal direction between the left and right viewpoint images as described above, the positional displacement amounts along the horizontal direction, that is, phase differences, provide parallax amounts from which a stereoscopic effect is created. For example, if attention is paid to the image pickup object B in FIGS. 8A and 8B, then the positional displacement amount Wb1 in the horizontal direction between the position B1L of the image B0' of the left viewpoint image L1 and the position B1R of the image B0'' of the right viewpoint image R1 is a parallax amount of the image pickup object B. Similarly, if attention is paid to the image pickup object C, then the positional displacement amount Wc1 in the horizontal direction between the position C1L of the image C0' of the left viewpoint image L1 and the position C1R of the image C0'' of the right viewpoint image R1 is a parallax amount of the image pickup object C.

If the left viewpoint image L1 and the right viewpoint image R1 are displayed using a 3D (three-dimensional) display method such as, for example, a polarizing method, a frame sequential method or a projector method, then an observer can feel, for example, such a stereoscopic effect as described below from the observed display image. In particular, in the example described above, the image pickup objects are observed in such a stereoscopic effect that the image pickup object A (a person) having no parallax is observed on the display screen, which is a reference plane, while the image pickup object B (a mountain) looks on the farther side than the reference plane and the image pickup object C (a flower) looks on the nearer side than the reference plane.

3. Driving Timings of the Shutter 11 and the Image Sensor 12

Figure 9A:
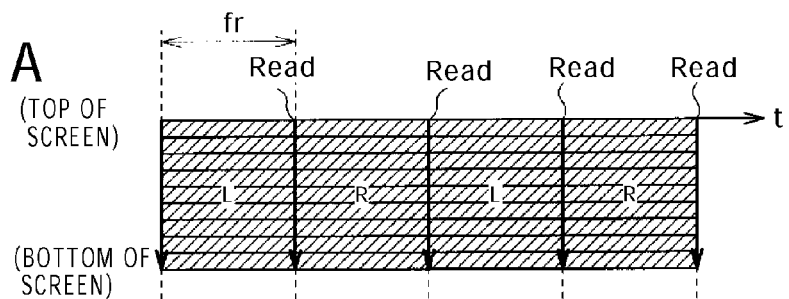
FIGS. 9A and 9B are diagrammatic views illustrating a driving timing of a CCD image sensor and opening and closing timings of a shutter in a comparative example 1.
Figure 9B:
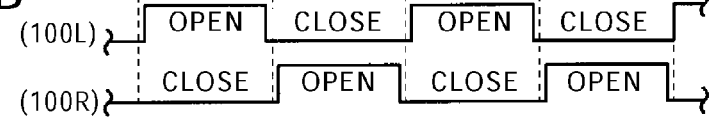
Figure 10A:
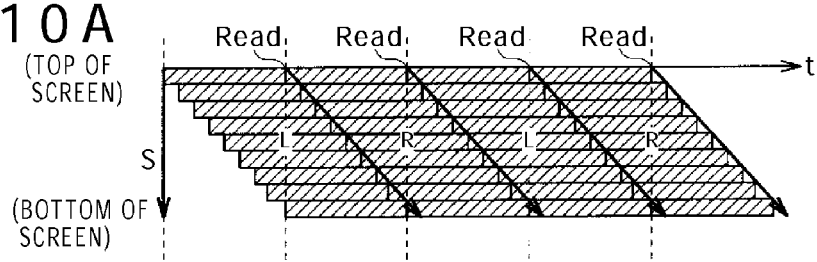
FIGS. 10A and 10B are diagrammatic views illustrating a driving timing of a CMOS image sensor and opening and closing timings of a shutter in a comparative example 2.
Figure 10B:

Now, an opening/closing changeover operation of the shutter 11 and exposure and signal reading out operations of the image sensor 12 are described in detail in comparison with comparative examples. FIGS. 9A and 9B schematically illustrate exposure and reading out timings of an image sensor in the form of a CCD image sensor and opening/closing changeover timings of a shutter according to a comparative example 1. Meanwhile, FIGS. 10A and 10B schematically illustrate exposure and reading out timings of an image sensor in the form of a CCD image sensor and opening/closing changeover timings of a shutter according to a comparative example 2. It is to be noted that a frame period herein corresponds to a period when a one-frame period of moving pictures is equally divided into two. Therefore, 2fr=one-frame period of moving pictures. In FIGS. 9A and 10A, each slanting line portion corresponds to an exposure period. It is to be noted here that, while description of the operations is given in connection with image pickup of moving pictures, also in the case of image pickup of still pictures, similar operations are carried out.

Comparative Example 1

In the comparative example 1 which uses a CCD image sensor, since the screen is driven simultaneously and plane-sequentially, the exposure period exhibits no temporal displacement within one screen image, that is, within one picked up screen image as seen in FIG. 9A, and also signal reading out (Read) is carried out at the same time. Further, the shutter is changed over such that, within an exposure period for picking up a left viewpoint image, the left region 100L is open while the right region 100R is closed, but within an exposure period for picking up a right viewpoint image, the right region 100R is open while the left region 100L is closed. More particularly, opening and closing of the left region 100L and the right region 100R are changed over in synchronism with an exposure starting timing, which is a frame period starting timing. Further, in the comparative example, the open periods of the left region 100L and the right region 100R are equal also to the frame period fr and the exposure period.

Comparative Example 2

However, in the case where a CMOS sensor, for example, of the rolling shutter type is used as the image sensor, different from the CCD image sensor described hereinabove, line-sequential driving is carried out, for example, from the top of the screen toward the bottom of the screen, that is, along a scanning direction S. For example, as seen in FIG. 10A, the exposure starting timing or the signal reading out (Read) timing differs for each line in one screen image. Therefore, a temporal displacement occurs with the exposure period depending upon the position in the screen image. In the case where such a CMOS sensor as just described is used, if opening/closing changeover of the shutter is carried out in synchronism with an exposure starting timing of the first line as seen in FIG. 10B, then the transmission line path changes over before the exposure of the entire screen, that is, of all lines, comes to an end.

Figure 11A:
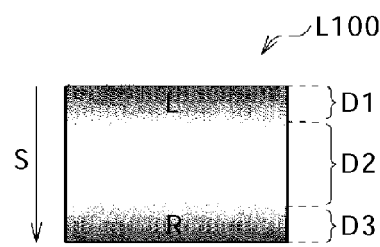
FIGS. 11A and 11B are schematic views of a left viewpoint image and a right viewpoint image obtained by timing control illustrated in FIGS. 10A and 10B.
Figure 11B:
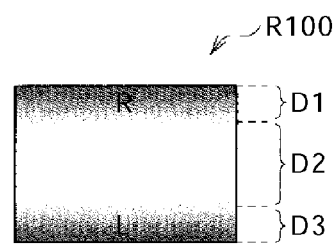

As a result, in the left viewpoint image L100 and the right viewpoint image R100, transmission light beams of the different light paths are received in a mixed state, resulting in appearance of left-right crosstalk. For example, in a picked up image frame of the left viewpoint image L100, the received light amount of the transmission light beam of the left light path gradually decreases from the top of the screen image toward the bottom of the screen image while the received light amount of the transmission light beam of the right light path gradually increases from the top of the screen image toward the bottom of the screen image. Consequently, for example, as seen in FIG. 11A, in the left viewpoint image L100, the received light amount of an upper portion D1 is based principally on a light beam from the left viewpoint direction while the received light amount of a lower portion D3 is based on a light beam from the right viewpoint direction, and in a mid portion D2, light beams from both viewpoint directions are mixed by crosstalk, resulting in reduction of the parallax amount. Similarly, also in the right viewpoint image R100, as seen in FIG. 11B, the received light amount of the upper portion D1 is based principally on a light beam from the right viewpoint direction while the received light amount of the lower portion D3 is based on a light beam from the left viewpoint direction, and in the mid portion D2, light beams from both viewpoint directions are mixed by crosstalk, resulting in reduction of the parallax amount. It is to be noted that the density in color in FIGS. 11A and 11B represents one-sidedness of the viewpoint direction components, and as the density increases, it is represented that the received light amount of a light beam from one of the left and right viewpoint directions is greater.

Accordingly, in the case where such left and right viewpoint images as described above are displayed by a predetermined method, since, in a mid portion of the screen image, the parallax amount is comparatively small or does not exist, stereoscopic display cannot be carried out, or planar 2D image display is carried out. Meanwhile, in the upper and lower portions of the screen image, a desired stereoscopic effect cannot be achieved.

Figure 12A:
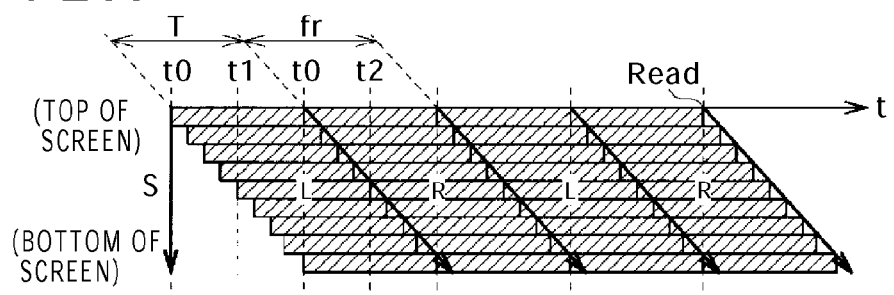
FIGS. 12A and 12B are diagrammatic views illustrating a relationship between a driving timing of an image sensor shown in FIG. 1 and opening and closing timings of the shutter shown in FIG. 1.
Figure 12B:
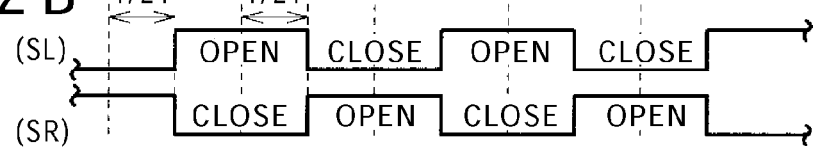

In contrast, in the present embodiment, opening/closing changeover of the shutter 11 in the frames or picked up image frames L and R is carried out after delay by a predetermined period from an exposure starting timing for the first line of the image sensor 12. In particular, referring to FIG. 12, opening/closing changeover between the regions SL and SR of the shutter 11 is carried out after delay by a period equal to one half an exposure period T from an exposure starting timing t0 for the first line. This is equivalent to that, at an exposure starting timing t1 of a central line in the scanning direction S, opening/closing changeover between the regions SL and SR of the shutter 11 is carried out. Consequently, in the frames L and R, while transmission light beams in the regions SL and SR of the shutter 11 are received in a mixed state at upper and lower portions of the screen, in a mid portion of the screen, a transmission light beam principally from a desired viewpoint direction is received.

Figures 13A, 13B, 13C:
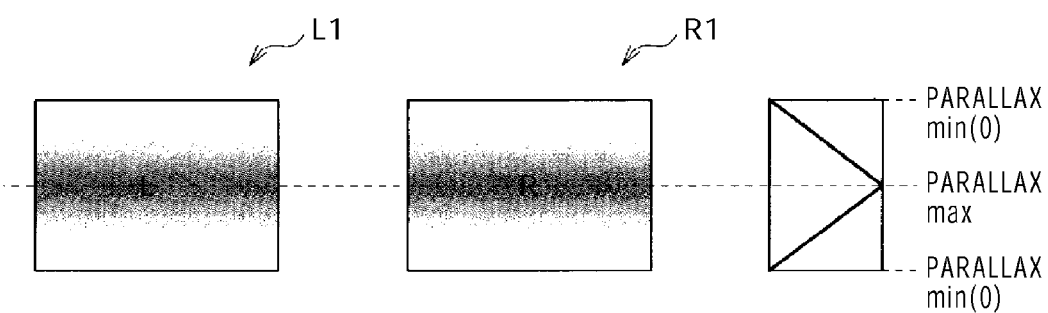
FIGS. 13A and 13B are schematic views of a left viewpoint image and a right viewpoint image obtained by timing control illustrated in FIGS. 12A and 12B.
FIG. 13C is a diagrammatic view illustrating a distribution of the parallax amount between the left and right viewpoint images.

In particular, as seen in FIG. 13A, in the left viewpoint image L1 corresponding to the frame L, the received light amount of a light beam from the left viewpoint direction is greatest in a mid portion of the screen image and gradually decreases toward the upper and lower end portions of the screen image. Meanwhile, the received light amount of a light beam from the right viewpoint direction is smallest in a mid portion of the screen image and gradually increases toward the upper and lower end portions of the screen image. Further, as seen in FIG. 13B, in the right viewpoint image R1 corresponding to the frame R, the received light amount of a light beam from the right viewpoint direction is greatest in a mid portion of the screen image and gradually decreases toward the upper and lower end portions of the screen image. Meanwhile, the received light amount of a light beam from the left viewpoint direction is smallest in a mid portion of the screen image and gradually increases toward the upper and lower end portions of the screen image. It is to be noted that the density in color in FIGS. 13A and 13B represents one-sidedness of the viewpoint direction components, and as the density increases, it is represented that the received light amount of a light beam from the left viewpoint direction or right viewpoint direction is greater.

Consequently, as seen in FIG. 13C, the parallax amount between the left viewpoint image L1 and the right viewpoint image R1 is greatest at the center of the screen image and gradually decreases toward the upper and lower end portions of the screen image. It is to be noted here that, at the upper and lower end portions, that is, at lines in the uppermost and lower portions, of the screen image, the received light amounts of light beams from the left and right viewpoint directions are equal to each other and each shares ½, and therefore, the parallax amount is zero. Further, in the present embodiment, the exposure period T and the open periods of the regions SL and SR of the shutter 11 are equal to the frame period fr, which is, for example, 8.3 ms, and opening/closing changeover of the shutter 11 is carried out after delay by a period of T/2, which is, for example, 4.15 ms, from the exposure starting timing for the first line.

Incidentally, when an observer observes a displayed image, generally a portion of a display screen image, which is watched closely, frequently is a mid portion of the screen image. As described above, in the present embodiment, since a light beam from a desired viewpoint direction is received in a mid portion of the screen image for every frame and a left-right parallax amount is created in a mid region of the screen image, a stereoscopic effect can be provided efficiently to the portion which is watched closely by the observer.

Meanwhile, in upper and lower portions of the screen image, since light beams from the different viewpoint directions exist in a mixed state, the parallax amount decreases or disappears in comparison with that in a mid portion of the screen image. However, this does not have a significant influence on the visibility of the observer, or in other words, the observer is less liable to feel the variation in parallax amount from a mid portion toward the upper and lower end portions of the screen image. Particularly in the case where stereoscopic image display is carried out with a very small parallax amount, that is, using a very small parallax, the observer will rarely perceive such a variation of the parallax amount as just described.

In particular, a feeling which a human being has in regard to a stereoscopic effect arises from a decision made synthetically taking various factors such as the arrangement, size and color of an article of an observation object and contrast of the article to some other article into consideration. Therefore, such variation of a parallax amount as described above is less likely to have a direct influence on the feeling in regard to a stereoscopic effect.

Or, if the article of the observation object is known to the observer, then the observer unconsciously corrects the feeling in regard to a stereoscopic effect of the article based on a preconception or an experience thereof and therefore is less likely to perceive such a variation of the parallax amount as described above. For example, in the case where a picture of a building erected uprightly from a lower portion toward an upper portion of a screen image is displayed stereoscopically, the picture is actually imaged such that, by such a variation of the parallax amount as described above, the profile of the building is distorted from a mid portion toward the upper and the lower ends of the building. However, since it is in most cases recognized by the observer that a building extends straightly, the observer is likely to visually recognize the building as a "straight building" without perceiving such distortion of the building as described above.

In the present embodiment, the shutter 11 is controlled for each picked up image frame to carry out opening/closing changeover of the regions of the shutter 11 after delay for a predetermined period from starting of exposure for the first line of the image sensor 12. Therefore, the image sensor 12 can receive, particularly in a mid portion of the screen image which is liable to be watched closely by the observer, a light beam from a desired viewpoint direction more than a light beam from any other viewpoint direction. Therefore, it is possible to use an image pickup element of the line-sequentially driven type to acquire a plurality of viewpoint images with a high degree of accuracy.

Further, by setting the delay period described above to a period equal to one half the exposure period T of the image sensor 12, the received light amount of a light beam in a desired viewpoint direction is greatest at the center of the screen image and gradually decreases toward the upper and lower ends of the screen image and light beams in different viewpoint directions received at an upper portion and a lower portion of the screen image are equally balanced with each other. In the case where the delay period is not equal to one half the exposure period, the light beam balance of received light in the different viewpoint directions between the upper portion and the lower portion of the screen image is lost. In such a case as just described, for example, if the rate of the right image is higher at the upper portion of the screen image, then the rate of the left image is higher at the lower portion of the screen image. Accordingly, if the stereoscopic effect at the upper portion of the screen image is correct, or in other words, if the picked up image frame is a frame in the right viewpoint direction, then a viewpoint image which is reverse in the leftward and rightward direction is observed at the lower portion of the screen image. Therefore, a phenomenon that the stereoscopic effects at the upper and lower portions of the screen image are reverse to each other occurs. Therefore, the opening/closing changeover timing of the shutter 11 is preferably delayed by a period equal to one half the exposure period T as described above.

Figure 14:
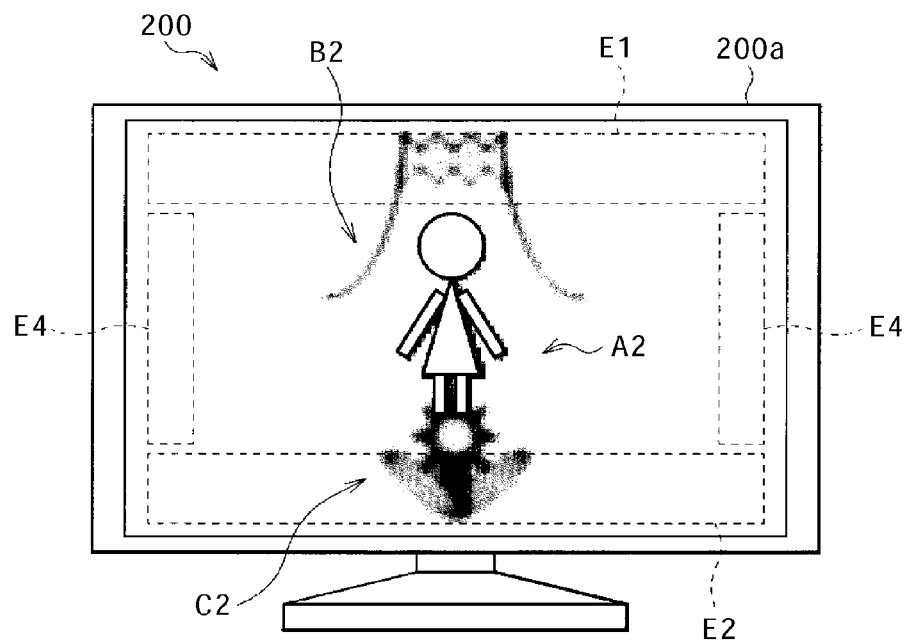
FIG. 14 is a schematic view illustrating a merit provided by reduction of the parallax amount at upper and lower portions of a screen image.

Merit by the Reduction of the Parallax Amount at Upper and Lower Portions of the Screen Image On the other hand, such reduction of the parallax amount at upper and lower portions of the screen image as described above provides the following merits. For example, while, upon actual stereoscopic image display, the left and right viewpoint images are displayed by a predetermined technique on a display unit or the like, in this instance, the stereoscopic effect in the proximity of the upper and lower ends of the displayed image is liable to be influenced by a picture frame of the display unit. In particular, in the case where image display is carried out on a display unit 200 as seen in FIG. 14, a picture frame 200a is observed together with the displayed image by the eyes of the observer. For example, it is assumed here that such stereoscopic display that a person A2 is displayed on the display screen image and a mountain B2 is positioned on the interior side with respect to the display screen image while a flower C2 positioned on the nearer side with respect to the display screen image is carried out. In this instance, for example, in the proximity of a region E2, the sense of distance to the flower C2 and the sense of distance to a bottom frame of the picture frame 200a are different from each other, and they sometimes conflict with each other. Similarly, in the proximity of a region E1, the sense of distance to the mountain B2 and the sense of distance to the top frame of the picture frame 200a sometimes conflict with each other. Therefore, the displayed image is drawn to the same plane as the frame surface of the picture frame 200a, that is, the stereoscopic effect is pushed back, and this sometimes gives rise to an uncomfortable feeling. Such an influence of the picture frame 200a on the stereoscopic effect as just described appears notably particularly in the regions E1 and E2 at upper and lower portions of the display screen image. This is because the display unit usually has a horizontally elongated screen having an aspect ratio of, for example, 16:9 and the picture frame 200a is liable to be visually recognized in the vertical direction or upward and downward direction than in the horizontal direction or leftward and rightward direction. Further, an image displayed particularly with such a stereoscopic effect that it projects to this side, that is, toward the observer side, from the picture frame 200a like the flower C2 in the region E2 is liable to be influenced by such a picture frame 200a as described above.

In this regard, in the present embodiment, since the parallax amount gradually decreases from the center toward the upper and lower ends of the screen image as described above, the parallax amount is very small in the regions E1 and E2 in the proximity of the picture frame 200a. Accordingly, in the regions E1 and E2 in the proximity of the picture frame 200a, since the display image is displayed almost in the proximity of the surface of the picture frame 200a, such conflict by a difference in sense of distance as described hereinabove is less likely to occur, but the display image looks as a natural image.

Now, modifications to the image pickup apparatus according to the embodiment described hereinabove, particularly modifications 1 to 3, are described. The modifications 1 and 2 relate to different examples of the exposure time of the image sensor 12 and the opening/closing changeover timing of the shutter 11 in the image pickup apparatus 1 described hereinabove. The modification 3 relates to another configuration of the image pickup apparatus which is formed as a twin-lens type camera.

Modification 1

Figure 15A:
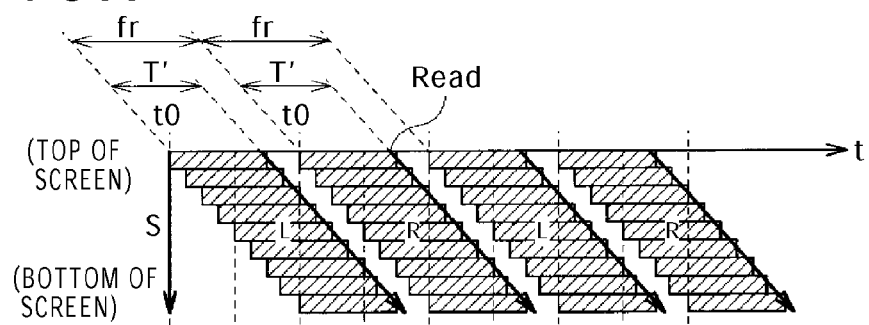
FIGS. 15A and 15B are schematic views illustrating a relationship between a driving timing of an image sensor and opening and closing timings of a shutter in a modification 1.
Figure 15B:
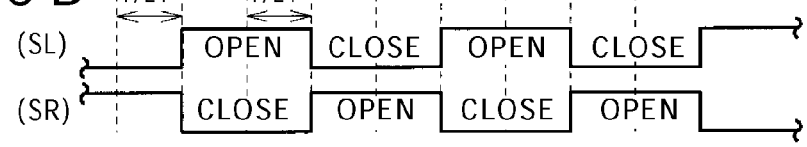

FIGS. 15A and 15B schematically illustrate exposure and reading out timings of an image sensor in the form of a CMOS image sensor according to the modification 1 and opening/closing changeover timings of a shutter. Also in the present modification 1, the image sensor 12 of the line-sequentially driven type is configured such that opening/closing changeover of the shutter 11 is carried out after delay by a predetermined period from the exposure starting timing of the first line similarly as in the first embodiment. Further, open periods of the regions of the shutter 11 correspond in a 1:1 corresponding relationship to frames, that is, a frame L and a frame R, corresponding to the regions, and the open periods of the regions and a one-frame period are substantially equal to each other. However, in the present modification 1, the exposure period for one line in the image sensor 12 is reduced. Thus, the frame period fr>exposure period T' is satisfied. At this time, exposure for the first line is started simultaneously with starting of a frame period fr, and upon lapse of the exposure period T', signal reading out is carried out. Thus, the signal reading out timing is advanced by a predetermined period whereas the exposure starting timing is not changed.

The exposure period of the image sensor 12 can be adjusted utilizing, for example, an electronic shutter function. Here, the frame period fr, which is equal to the open period or closed period of the shutter 11, is set to 8.3 ms, and the exposure period is reduced to approximately 60% of the possible exposure period. Thus, the exposure period $T'=8.3\times0.6\approx5$ ms. Further, the opening/closing changeover of the shutter 11 is carried out after delay by a period equal to, for example, one half the exposure period T' from the exposure starting timing for the first line similarly as in the embodiment described hereinabove.

Consequently, in each of the frames L and R, transmission light beams through both of the regions SL and SR of the shutter 11 are received in a mixed manner at upper and lower portions of the screen image while, in a mid portion, a transmission light beam principally from a desired viewpoint direction is received. It is to be noted that, in the present modification 1, the range within which a light beam from a desired viewpoint direction is acquired, that is, a range along the scanning direction S, is greater than that in the embodiment described hereinabove.

In particular, as seen in FIG. 16A, in the left viewpoint image L1, the received light amount of a light beam from the left viewpoint direction is greatest in a mid portion of the screen image and gradually decreases toward the upper and lower ends of the screen image. On the other hand, a light beam from the right viewpoint direction is not received in a mid portion of the screen image but is received only in the proximity of the upper and lower ends of the screen image. Meanwhile, as seen in FIG. 16B, in the right viewpoint image R1, the received light amount of a light beam from the right viewpoint direction is greatest in a mid portion of the screen image and gradually decreases toward the upper and lower ends of the screen image. On the other hand, a light beam from the left viewpoint direction is not received in a mid portion of the screen image but is received only in the proximity of the upper and lower ends of the screen image. It is to be noted that the density in color in FIGS. 16A and 16B represents one-sidedness of the viewpoint direction components, and as the density increases, it is represented that the rate of the received light amount of a light beam from the left viewpoint direction or right viewpoint direction is higher.

Consequently, as seen in FIG. 16C, the parallax amount between the left viewpoint image L1 and the right viewpoint image R1 increases over a wide range from the center of the screen image to the proximity of upper and lower end portions of the screen image and decreases from the proximity of the upper and lower end portions of the screen image toward the upper and lower ends of the screen image. It is to be noted here that the received light amounts of light beams from the left and right viewpoint directions at the upper and lower end portions of the screen image, that is, at the uppermost and lowermost lines, are ½ and equal to each other, and therefore, the parallax amount is zero.

Also in the case where the exposure period T' is reduced as in the present modification 1, similar effects to those of the embodiment described hereinabove can be achieved. Further, by the reduction of the exposure period T', it is possible to widen the light reception range of a light beam from a desired viewpoint direction, that is, the range within which the rate of the received light amount of a light beam from the different viewpoint direction increases, in each of the frames L and R to expand a parallax formation range in the screen. In other words, as the exposure period T' decreases with respect to the frame period fr, the light reception range of a light beam from a corresponding viewpoint direction in each frame can be expanded.

Modification 2

FIGS. 17A and 17B schematically illustrate exposure and reading out timings of an image sensor in the form of a CMOS image sensor according to a modification 2 and opening/closing changeover timings of a shutter. In the present modification 2, the exposure period for one line in the image sensor 12 is reduced similarly as in the modification 1 described hereinabove, that is, the frame period fr>exposure period T' is satisfied. However, the exposure starting and signal reading out timings are different from those in the modification 1 described hereinabove. In particular, in the present modification 2, exposure for the first line is started after lapse of a predetermined period after a frame period fr is started, and signal reading out is carried out upon lapse of the exposure period T'. In other words, the exposure starting timing is delayed by a predetermined period whereas the signal reading out timing is not changed. It is to be noted that, also here, the frame period fr equal to the open periods and the closed periods of the regions SL and SR of the shutter 11 is set, for example, to 8.3 ms and the exposure period is reduced to approximately 60% of the possible exposure period. Thus, the exposure period T'=8.3×0.6≈5 ms. Further, the opening/closing changeover of the shutter 11 is carried out after delay by a period equal to, for example, one half the exposure period T', that is, 2.5 ms, from the exposure starting timing for the first line similarly as in the embodiment described hereinabove.

Consequently, in each of the frames L and R, transmission light beams through both of the regions SL and SR of the shutter 11 are received in a mixed state at upper and lower portions of the screen image. However, in a mid portion of the screen image, a transmission light beam principally from a desired viewpoint direction is received. Further, similarly as in the modification 1, the range within which a light beam in a desired viewpoint direction is acquired, that is, the range along the scanning direction S, is increased as seen in FIGS. 18A and 18B. In particular, the parallax amount between the left viewpoint image L1 and the right viewpoint image R1 is great over a wide range from the center of the screen image to the proximity of upper and lower end portions of the screen image and decreases from the proximity of the upper and lower end portions toward the upper end lower ends of the screen image.

When the exposure period T' is reduced as in the present modification 2, the exposure starting timing may be delayed without changing the signal reading out timing. Also in this instance, similar effects to those of the embodiment and the modification 1 described hereinabove can be achieved.

Modification 3

In the present modification, the control section 17 in the image pickup apparatus 1 described hereinabove can carry out changeover between a first mode in which the timing control described hereinabove, that is, control of delaying the opening/closing timings of the shutter 11, is delayed by a predetermined period and a second mode hereinafter described. In the first mode, for example, such timing control as described hereinabove in the description of the embodiment (exposure period=frame period) or such timing control as described in the description of the modifications 1 and 2 (exposure period<frame period) may be carried out.

Second Mode

Figure 19A:
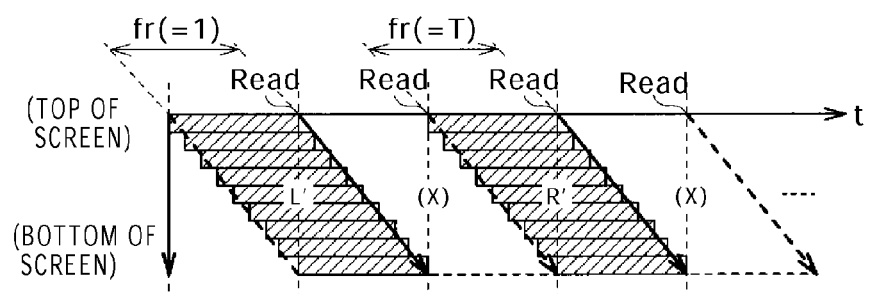
FIGS. 19A and 19B are schematic views illustrating a relationship between a driving timing of an image sensor and opening and closing timings of a shutter in a modification 3.
Figure 19B:
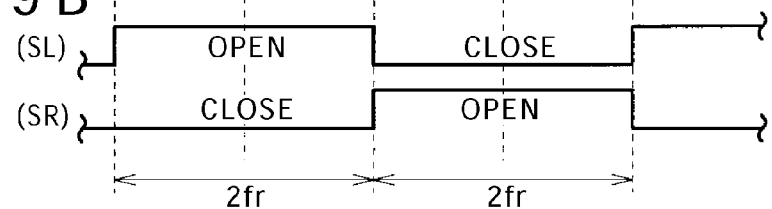

FIGS. 19A and 19B schematically illustrate exposure and reading out timings of the image sensor in the form of a CMOS image sensor and opening/closing changeover timings of a shutter in the second mode. In this manner, in the second mode, frames corresponding to left and right viewpoint images are acquired alternately for every other frame as valid frames.

In particular, the control section 17 acquires a frame, that is, a frame L', at a certain point of time and another frame, that is, a frame R', in which exposure for the first line is started after reading out of all lines of the frame L' is completed, that is, after an end of exposure, as valid frames. In other words, a frame which is later than the frame L' and in which exposure is started before reading out of all lines of the frame L' is ended, that is, before exposure for all lines is ended, and hence a frame X between the frames L' and R', is determined as an invalid frame. This frame X may be prevented from being outputted to associated processing sections from the image processing section 13 or the reading out itself is not carried out, for example, after the reading out is ended.

Further, as seen from FIG. 19B, opening/closing changeover of the shutter 11 is carried out such that the open periods and the closing periods of the regions SL and SR of the shutter 11 are equal, for example, to twice the frame period fr. Here, the frame period fr is fr=exposure period T. In this manner, in the second mode, the frames L', R', . . . acquired for every other frame are determined as valid frames, and the open period of the shutter 11 is set to twice the frame period fr.

Figures 20A, 20B:
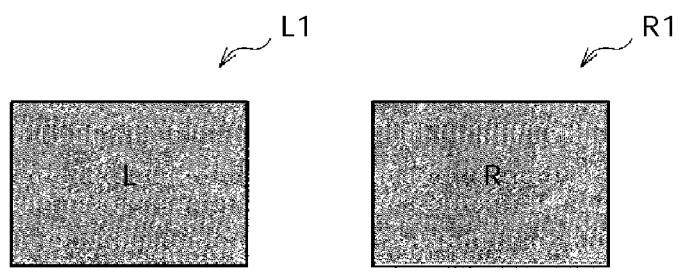
FIGS. 20A and 20B are schematic views of a left viewpoint image and a right viewpoint image obtained by timing control illustrated in FIGS. 19A and 19B.

As described hereinabove, in an image sensor of the line-sequentially driven type, crosstalk is liable to occur in the proximity of the center of a screen image of each frame. However, in the case where the frames L' and R' are acquired for every other frame and the open period of the shutter 11 is set to twice the frame period as in the second mode, a frame in which crosstalk occurs, that is, the frame X, is excluded. Further, opening/closing changeover of the shutter 11 does not occur within the exposure period T for all lines of the frames L' and R', or in other words, regions SR and SL are maintained as they are in the open state or the closed state. Therefore, in the left viewpoint image L'1 corresponding to the frame L', only a light beam from the left viewpoint direction is received in the overall area of the screen as seen in FIG. 20A. Meanwhile, in the right viewpoint image R'1 corresponding to the frame R', only a light beam from the right viewpoint direction is received in the overall area of the screen as seen in FIG. 20B. In other words, also in the present second mode, left and right viewpoint images can be acquired with a high degree of accuracy.

Changeover of the Mode

In the first mode described hereinabove in the description of the embodiment and so forth, image pickup can be carried out without sampling out frames, or in other words, image pickup for each frame can be carried out. Therefore, the light utilization efficiency is higher in the first mode than in the second mode in which frames are substantially sampled out. On the other hand, in the second mode, crosstalk is less likely to occur in the overall area of the screen, or in other words, the parallax amount is uniform in the overall screen image. Therefore, viewpoint images can be acquired with a higher degree of accuracy than those in the first mode in which the parallax amount is different between a mid portion and upper and lower portions of the screen image.

Accordingly, changeover between the first mode and the second mode may be carried out, for example, in response to the brightness of an image pickup object. A decision regarding the brightness can be carried out, for example, utilizing an AE (Automatic Exposure) function not shown incorporated in the control section 17. For example, the first mode is executed in the case where the brightness is lower than a predetermined threshold level, but the second mode is executed in the case where the brightness is equal to or higher than the threshold value. Consequently, the mode can be automatically changed over such that the first mode is established when image pickup is to be carried out at a place at which the light amount is not sufficient such as in a room but the second mode is established when image pickup is to be carried out at a place at which the light amount is sufficient such as outdoors. Or, such mode changeover may be carried out manually by the user or the like, or in other words, in accordance with an external input signal.

Changeover between the first mode in which opening/closing timings of the shutter 11 are delayed to acquire viewpoint images and the second mode in which viewpoint images are acquired for every other frame may be carried out automatically or manually. In this instance, similar effects to those achieved by the embodiment described hereinabove can be achieved, and appropriate viewpoint image pickup can be carried out in response to the brightness of an image pickup object.

Modification 4

General Configuration of the Image Pickup Apparatus 2

Figure 21:
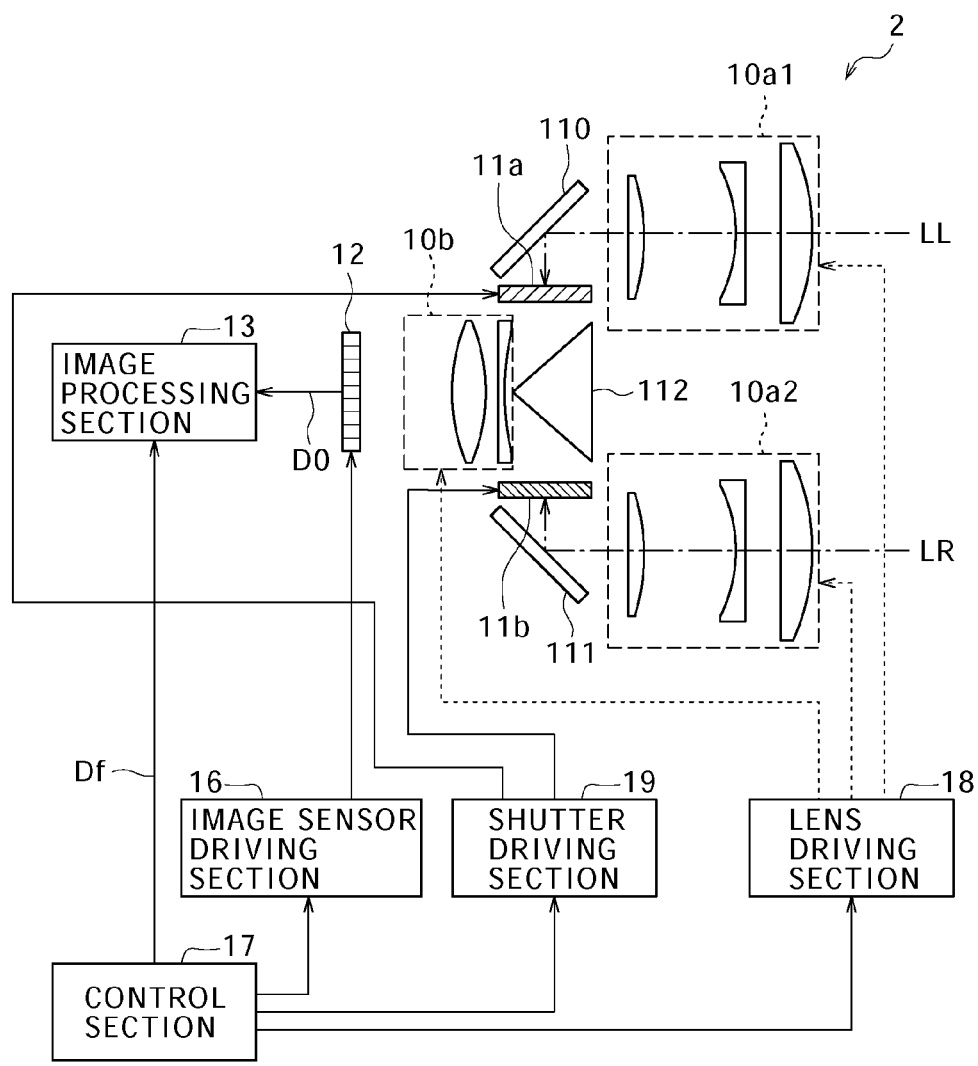
FIG. 21 is a block diagram showing a general configuration of an image pickup apparatus according to a modification 4.

FIG. 21 shows a general configuration of an image pickup apparatus 2 according to a modification 4. Referring to FIG. 21, the image pickup apparatus 2 picks up images of an image pickup object from left and right viewpoint directions to acquire left and right viewpoint images in a time series as moving pictures or still pictures. However, the image pickup apparatus 2 of the present modification 4 is a twin-lens camera which includes image pickup lenses 10a1 and 10b and image pickup lenses 10a2 and 10b for light paths for acquiring light beams LL and LR from left and right viewpoint directions and includes shutters 11a and 11b for the individual light paths. Here, the image pickup lens 10b is a component common to the light paths. Further, the image pickup apparatus 2 includes, as common components to the light paths, an image sensor 12, an image processing section 13, a lens driving section 18, a shutter driving section 19, an image sensor driving section 16 and a control section 17 similarly as in the image pickup apparatus 1 of the embodiment described hereinabove.

The image pickup lenses 10a1 and 10b are a lens group for acquiring the light beam LL in the left viewpoint direction while the image pickup lenses 10a2 and 10b are another lens group for acquiring the light beam LR in the right viewpoint direction. The shutter 11a is disposed between the image pickup lenses 10a1 and 10b while the shutter 11b is disposed between the image pickup lenses 10a2 and 10b. It is to be noted that, although the arrangement of the image pickup lenses 10a and 10b is not limited particularly, preferably they are disposed ideally at a pupil plane of the image pickup lens group or of an iris not shown.

The image pickup lenses 10a1 and 10b and the image pickup lenses 10a2 and 10b generally function, for example, as zoom lenses. The focal length of the image pickup lenses 10a1 and 10b and the image pickup lenses 10a2 and 10b can be varied by adjusting the lens distance or the like by means of the lens driving section 14. Further, each lens group is configured from one or a plurality of lenses. A mirror 110 is interposed between the image pickup lens 10a1 and the shutter 11a and another mirror 111 is interposed between the image pickup lens 10a2 and the shutter 11b while a further mirror 112 is interposed between the shutters 11a and 11b. The mirrors 110 to 112 allow the light beams LL and LR to pass through the shutters 11a and 11b and then be introduced into the image pickup lens 10b.

The shutters 11a and 11b are provided to change over transmission and blocking of the left and right paths, respectively, and changeover control of the shutters 11a and 11b is carried out such that they are individually changed over between an open state, that is, a light transmission state, and a closed state, that is, a light interrupting state. The shutters 11a and 11b may be mechanical shutters or electric shutters such as liquid crystal shutters if they can carry out such light path changeover as described above.

The lens driving section 18 is an actuator for shifting predetermined lenses in the image pickup lenses 10a1 and 10b or the image pickup lenses 10a2 and 10b in accordance with respective optical axis.

The shutter driving section 19 carries out opening/closing changeover driving of the shutters 11a and 11b. In particular, the shutter driving section 19 drives the shutters 11a and 11b such that, when the shutter 11a has an open state, the shutter 11b has a closed state, but when the shutter 11a has a closed state, the shutter 11b has an open state. Further, when the viewpoint images are to be acquired as moving pictures, the shutter driving section 19 drives the shutters 11a and 11b such that the open state and the closed state are changed over alternately and time-divisionally for each of the shutters 11a and 11b.

Working Effect of the Image Pickup Apparatus 2

In such an image pickup apparatus 2 as described above, the lens driving section 18 drives the image pickup lenses 10a1 and 10b while the shutter driving section 19 drives the shutter 11a into an open state and the shutter 11b into a closed state under the control of the control section 17. Further, in synchronism with the operations, the image sensor driving section 16 drives the image sensor 12 to receive light. Consequently, the left light path corresponding to the left viewpoint direction is rendered valid, and the image sensor 12 receives light based on the light beam LL from between incoming light beams from the image pickup object side to acquire left viewpoint image data D0L.

Then, the lens driving section 18 drives the image pickup lenses 10a2 and 10b and the shutter driving section 19 changes over the shutter 11b to an open state and the shutter 11a to a closed state. Further, in synchronism with the operations, the image sensor driving section 16 drives the image sensor 12 to receive light. Consequently, the valid light path is changed over to the right light path corresponding to the right viewpoint direction, and the image sensor 12 carries out light reception based on the light beam LR from among the incoming light beams from the image pickup object side to acquire right viewpoint image data D0R. By carrying out such changeover driving of the image pickup lenses 10a1 and 10a2 and the shutters 11a and 11b as described above time-divisionally and alternately, picked up image data corresponding to the left viewpoint image and the right viewpoint image are acquired alternately along a time series. Sets of the left and right viewpoint images are successively inputted to the image processing section 13.

At this time, the opening/closing changeover of the regions of the shutter 11 is carried out after delay by a predetermined period from starting of exposure for the first line of the image sensor 12 in each picked up image frame. Consequently, the image sensor 12 can receive, particularly at a mid portion of the screen image thereof, which is liable to be watched closely by the observer, a transmission light beam from a desired viewpoint direction by a greater amount than a light beam from the other viewpoint direction. Therefore, it is possible to use the image sensor 12 of the line-sequentially driven type to acquire a plurality of viewpoint images with a high degree of accuracy.

Then, the image processing section 13 carries out a predetermined image process for picked up images based on the left viewpoint image data D0L and the right viewpoint image data D0R acquired in such a manner as described above to produce, for example, left and right viewpoint images for a stereoscopic vision. The produced viewpoint images are recorded into the image processing section 13 or outputted to the outside.

As described above, the technology disclosed herein can be applied also to a twin-lens camera wherein image pickup lenses are disposed individually for left and right light paths. Also in the case where such an image pickup optical system as described above is used, similar effects to those achieved by the embodiment described hereinabove can be achieved by carrying out opening/closing changeover of the shutter 11 after delay by a predetermined period from starting of exposure for the first line of the image sensor 12. Further, also in the image pickup apparatus 2 of the present modification 4, such timing control as described hereinabove in connection with the modification 1 or 2 may be carried out, or such mode changeover as described hereinabove in connection with the modification 3 may be carried out.

While the present technology has been described in connection with the embodiment and modifications thereof, the present technology is not limited to the embodiment and modifications described above but allows various alterations and modifications. For example, while, in the embodiment and modifications described hereinabove, changeover between two left and right light paths is carried out to obtain two left and right viewpoint images for which a predetermined image process is to be carried out, the viewpoint directions are not limited to leftwardly and rightwardly separated, that is, horizontally separated, directions but may be upwardly and downwardly separated, that is, vertically separated, directions.

Further, three or more light paths may be provided so as to be change over thereamong thereby to allow three or more multiple viewpoint images to be acquired. In this instance, the shutter may be configured from a plurality of regions as in the case of the image pickup apparatus 1 of the embodiment described hereinabove, or a plurality of shutters may be provided individually for the light paths as in the image pickup apparatus 2 according to the modification 4 described hereinabove.

Figure 22A:
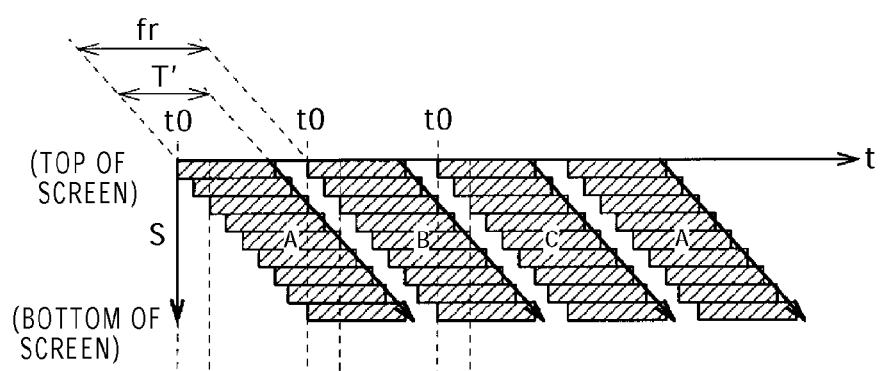
FIGS. 22A and 22B are diagrammatic views illustrating a relationship between a driving timing of an image sensor according to a different modification and opening and closing timings of a shutter.
Figure 22B:
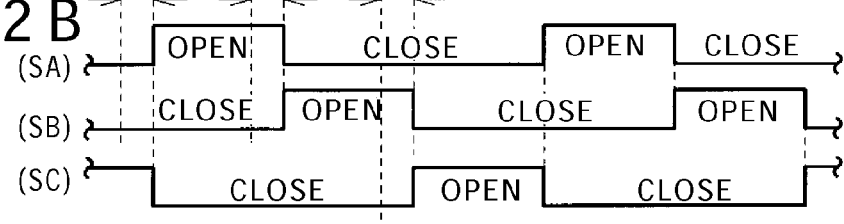

As an example, FIGS. 22A and 22B schematically illustrate driving timings of an image sensor and opening/closing changeover timings of a shutter in the case where three viewpoint images are acquired using a shutter having three regions SA, SB and SC, or shutters SA, SB and SC individually provided for three light paths. It is to be noted that the example described hereinabove in connection with the modification 1 from among the embodiment and modifications described hereinabove wherein the signal reading out timing is advanced to shorten the exposure period where the exposure period T'<frame period fr is satisfied is described here. Also in the case where changeover among the three light paths is carried out to acquire viewpoint images based on light beams from three viewpoint directions in this manner, opening/closing changeover of the shutter may be carried out after delay by a predetermined period T'/2 after starting of exposure for the first line of the image sensor 12 similarly as upon image pickup of left and right viewpoint images described hereinabove.

In particular, upon image pickup of a frame A, the region SA is changed over from a closed state to an open state and the region SC is changed over from an open state to a closed state after delay by T'/2 from starting of exposure for the first line of the frame A while the region SB is kept in a closed state. Then, upon image pickup of a frame B, the region SB is changed over to an open state and the region SA is changed over to a closed state after delay by T'/2 from starting of exposure for the first line of the frame B while the region SC is kept in a closed state. Similarly, upon image pickup of a frame C, the region SC is changed over to an open state and the region SB is changed over to a closed state after delay by T'/2 from starting of exposure for the first line of the frame C while the region SA is kept in a closed state. Consequently, similarly as in the embodiment and modifications described hereinabove, in the three viewpoint images, a light beam from a desired viewpoint direction can be received readily at a mid portion of the screen image. Therefore, effects similar to those achieved by the embodiment and the modification 1 can be achieved.

Further, while, in the embodiments and modifications described hereinabove, the opening and closing timings of the shutter are delayed by a period equal to one half (½) the exposure period, the delay period may not necessarily be equal to ½ the exposure period. However, if the exposure period is set to ½, then it is easy to establish a balanced state between left and right parallaxes at upper and lower portions of the screen image. In the case where the delay period is not equal to ½ the exposure period, the left and right parallax balance is lost at upper and power portions of the screen image, but such loss of the balance can be avoided by adjusting the length of the open periods of the shutter.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. An image pickup apparatus, comprising:
   an image pickup lens;
   a shutter capable of changing over a plurality of light paths from said image pickup lens individually between a light transmission state and a light blocking state;
   an image pickup element including a plurality of light receiving pixels for which exposure and signal reading out are carried out line-sequentially and adapted to acquire picked up image data based on transmission light beams of the light paths; and
   a control section adapted to control changeover between the light transmission state and the light blocking state of the light paths by said shutter;
   said control section controlling said shutter such that, in each picked up image frame, the changeover between the light transmission state and the light blocking state of the light paths is carried out after delay by a predetermined period after starting of exposure for the first line of said image pickup element, and wherein said control section can carry out changeover between a first mode in which, in each picked up image frame, said control section controls said shutter such that the changeover between the light transmission state and the light blocking state for each of the light paths is carried out after delay by the predetermined period after starting of exposure for the first line of said image pickup element and a second mode in which a plurality of viewpoint images are acquired alternately for every other frame as valid frames in response to a brightness of an image pickup object or to an external input signal.

2. The image pickup apparatus according to claim 1, wherein said control section controls said shutter such that the changeover between the light transmission state and the light blocking state of the light paths is carried out after delay by a period equal to one half an exposure period after starting of exposure for the first line of said image pickup element.

3. The image pickup apparatus according to claim 2, wherein said control section controls said shutter such that the exposure period for one line of said image pickup element is shorter than a frame period.

4. The image pickup apparatus according to claim 3, wherein said control section advances a signal reading out timing for the first line of said image pickup element in each picked up image frame.

5. The image pickup apparatus according to claim 3, wherein said control section delays an exposure starting timing for the first line of said image pickup element in each picked up image frame.

6. The image pickup apparatus according to claim 1, wherein said shutter has a response characteristic upon transition from the light transmission state to the light blocking state and a response characteristic upon transition from the light blocking state to the light transition state, which are substantially equal to each other.

7. The image pickup apparatus according to claim 6, wherein said shutter is a liquid crystal shutter for which ferroelectric liquid crystal is used.

8. The image pickup apparatus according to claim 1, wherein, in the second mode, said control section acquires, from among a plurality of frames which are successive in time from said image pickup element, at least a first frame and a second frame in which exposure for the first line is started after exposure for all lines of the first frame comes to an end as the valid frames, and controls said shutter to carry out the changeover between the light transmission state and the light blocking state for each of the light paths in synchronism with a frame starting timing of each of the valid frames.

* * * * *